US009306649B2

(12) United States Patent
Kang et al.

(10) Patent No.: US 9,306,649 B2
(45) Date of Patent: Apr. 5, 2016

(54) METHOD AND APPARATUS IN WHICH USER EQUIPMENT TRANSMITS FEEDBACK INFORMATION IN A DISTRIBUTED ANTENNA SYSTEM

(75) Inventors: Ji Won Kang, Anyang-si (KR); Jin Young Chun, Anyang-si (KR); Su Nam Kim, Anyang-si (KR); Bin Chul Ihm, Anyang-si (KR); Sung Ho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 693 days.

(21) Appl. No.: 13/637,215

(22) PCT Filed: Mar. 23, 2011

(86) PCT No.: PCT/KR2011/001991
§ 371 (c)(1),
(2), (4) Date: Sep. 25, 2012

(87) PCT Pub. No.: WO2011/118978
PCT Pub. Date: Sep. 29, 2011

(65) Prior Publication Data
US 2013/0010744 A1    Jan. 10, 2013

Related U.S. Application Data

(60) Provisional application No. 61/317,282, filed on Mar. 25, 2010.

(30) Foreign Application Priority Data

Sep. 13, 2010    (KR) ........................ 10-2010-0089201

(51) Int. Cl.
*H04B 7/06*    (2006.01)

(52) U.S. Cl.
CPC ............ *H04B 7/0626* (2013.01); *H04B 7/0623* (2013.01); *H04B 7/0645* (2013.01); *H04B 7/0691* (2013.01)

(58) Field of Classification Search
CPC .. H04B 7/0623; H04B 7/0691; H04B 7/0645; H04B 7/0626; H04B 7/0874; H04B 7/0417; H04B 7/0617; H04B 7/0639; H04B 7/0469; H04L 5/005; H04L 25/03343; H04L 2025/03426; H04L 2025/03802; H04L 5/0023
See application file for complete search history.

(56) References Cited

U.S. PATENT DOCUMENTS

2001/0028677 A1*  10/2001  Wang et al. ................... 375/148
2001/0048709 A1*  12/2001  Hoffmann et al. ............ 375/130
(Continued)

FOREIGN PATENT DOCUMENTS

JP      2009-508370       2/2009
JP      2010-068496       3/2010
WO      WO 2008050467 A1 *  5/2008 .................... 370/260

OTHER PUBLICATIONS

Japan Patent Office Application Serial No. 2013-501187, Office Action dated Oct. 30, 2013, 3 pages.
(Continued)

Primary Examiner — Yee Lam
(74) Attorney, Agent, or Firm — Lee, Hong, Degerman, Kang & Waimey

(57) ABSTRACT

Provided is a method for transmitting feedback information of a UE in a distributed antenna system in which a plurality of antennas are distributedly disposed within a cell is provided. The method includes transmitting first feedback information used for a base station (BS) to allocate at least one of a plurality of antennas to a UE, to the BS; receiving antenna allocation information determined based on the first feedback information from the BS; and transmitting second feedback information indicating a channel state with respect to an antenna allocated according to the antenna allocation information to the BS.

14 Claims, 8 Drawing Sheets

(56) References Cited

U.S. PATENT DOCUMENTS

| | | | |
|---|---|---|---|
| 2005/0195912 A1* | 9/2005 | Kim et al. | 375/267 |
| 2006/0111050 A1* | 5/2006 | Choi et al. | 455/67.11 |
| 2008/0165741 A1* | 7/2008 | Fu et al. | 370/332 |
| 2009/0061939 A1* | 3/2009 | Andersson et al. | 455/562.1 |
| 2009/0247229 A1* | 10/2009 | Teo et al. | 455/562.1 |
| 2009/0316811 A1* | 12/2009 | Maeda et al. | 375/260 |
| 2010/0246561 A1* | 9/2010 | Shin | H04W 52/32 370/345 |
| 2010/0285762 A1* | 11/2010 | Ko | H04L 5/0023 455/127.1 |
| 2011/0205930 A1* | 8/2011 | Rahman et al. | 370/252 |
| 2011/0261716 A1* | 10/2011 | Kim | H04B 7/0671 370/252 |

OTHER PUBLICATIONS

Osawa, Ryosuke, et al., "Performance of two-way channel estimation technique for multi-user distributed antenna systems with spatial precoding," 2009 IEEE 70th Vehicular Technology Conference Fall (VTC 2009-Fall), pp. 1-5, Sep. 23, 2009.

Chen, Xiaoming, et al., "Codebook design and power allocation for distributed space time codes," 2009 IEEE 70th Vehicular Technology Conference Fall (VTC 2009-Fall), pp. 1-5, Sep. 23, 2009.

Jiansong, Gan, et al., "Reducing channel state information feedback for downlink distributed antenna system," 2009 IEEE 20th International Symposium on Personal, Indoor and Mobile Radio Communications, pp. 2767-2771, Sep. 16, 2009.

* cited by examiner

METHOD AND APPARATUS IN WHICH USER EQUIPMENT TRANSMITS FEEDBACK INFORMATION IN A DISTRIBUTED ANTENNA SYSTEM

CROSS-REFERENCE TO RELATED APPLICATIONS

This application is the National Stage filing under 35 U.S.C. 371 of International Application No. PCT/KR2011/001991, filed on Mar. 23, 2011, which claims the benefit of earlier filing date and right of priority to Korean Patent Application No. 10-2010-0089201, filed on Sep. 13, 2010, and also claims the benefit of U.S. Provisional Application Ser. No. 61/317,282, filed on Mar. 25, 2010, the contents of which are all hereby incorporated by reference herein in their entirety.

TECHNICAL FIELD

The present invention relates to wireless communication and, more particularly, to a method for transmitting feedback information by a terminal in a distributed antenna system, and a terminal using the method.

BACKGROUND ART

In a distributed antenna system (DAS), antennas are distributed to and disposed in various locations within a cell, and a single base station (BS) manages these antennas. A DAS is different from the conventional centralized antenna system (CAS) in which antennas localize on the center of a cell.

A DAS is differentiated from a femto cell/pico cell, a relay station, and an ad-hoc system. The DAS is different from a femto cell/pico cell in which an individual antenna constitutes a separate network, in that an individual antenna does not administer an antenna region thereof by itself but a central BS administers all the antenna regions. Also, the DAS is discriminated from a relay station or an ad-hoc system, in that respective antennas may be connected by a fixed line. Also, the DAS is differentiated from a simple repeater, in that respective antennas may transmit different signals according to a command from a BS.

An initial purpose of a DAS was to install more antennas within a cell and repeatedly transmit signals in order to cover a shadow area. Namely, initially, a DAS was mainly aimed at securing coverage. Macroscopically, a DAS may be considered as a type of multi-input multi-output (MIMO) system in that antennas may simultaneously transmit or receive a plurality of data streams to support one or a plurality of users. A MIMO system is recognized as a system satisfying next-generation communication due to high spectral efficiency. In the point of view of a MIMO system, a DAS has more advantages than that of a CAS. For example, a distance between users and antennas is reduced to have high power efficiency, a channel capacity is increased due to low correlation and interference between antennas, and relatively uniform quality of communication can be secured irrespective of a user location within a cell.

Namely, a DAS having the foregoing advantages is required to perform MIMO transmission in order to secure a high data capacity required in the present and future communication standards. For example, it may be required to perform rank-2 transmission or higher to a single user equipment (UE) (it is known as a single user (SU)-MIMO) in the same frequency domain. Or, a multi-user (MU)-MIMO simultaneously supporting multiple UEs may be required. Such necessity may also be required in uplink, as well as in downlink.

The foregoing SU-MIMO and MU-MIMO are essentially required in IEEE 802 and 3GPP LTE as standardization groups, and in actuality, standards such as IEEE (Institute of Electrical and Electronics Engineers) 802.16e/m, 3GPP ($3^{rd}$ generation partnership project) LTE (long term evolution) Release 8/9, and the like, deal with SU-MIMO and MU-MIMO. However, currently, communication standards are designed on the premise of a CAS, so they cannot be applied as is to a DAS employing an advanced technique such as a MIMO technique. Thus, a communication standard supporting a DAS is required, and also, a method for transmitting feedback information of a terminal (or a user equipment (UE)) based on such a communication standard and a UE operating according to the method are required.

TECHNICAL PROBLEM

An aspect of the present invention provides a method for transmitting feedback information of a UE in a distributed antenna system and a UE using the method.

According to an aspect of the present invention, there is provided a method for transmitting feedback information of a user equipment (UE) including: transmitting first feedback information used for a base station (BS) to allocate at least one of a plurality of antennas to a UE, to the BS; receiving antenna allocation information determined based on the first feedback information from the BS; and transmitting second feedback information indicating a channel state with respect to an antenna allocated according to the antenna allocation information to the BS.

The first feedback information may include at least one of information regarding a downlink channel coefficient with respect to a effective antenna from the BS to the UE, a reception noise strength measured by the UE, a downlink channel size or signal strength with respect to the effective antenna, an index of an antenna preferred by the UE or an antenna having channel quality exceeding a particular threshold value, a sounding reference signal and information regarding transmission power with respect to the sounding reference signal.

When a reference signal of each of the plurality of antennas is measured by the UE, the effective antenna may be an antenna transmitting a reference signal exceeding the threshold value or the entirety of the plurality of antennas.

The information regarding a downlink channel coefficient, a sounding reference signal and information regarding transmission power with respect to the sounding reference signal, a downlink channel size or signal strength with respect to the effective antenna may be transmitted as values normalized with a reception noise strength measured by the UE.

The method may further include: receiving a sounding reference signal transmission request from the BS, wherein the first feedback information may include the sounding reference signal and information regarding transmission power with respect to the sounding reference signal.

The method may further include: receiving a reference signal discriminated with respect to each of the plurality of antennas from the BS, wherein the first feedback information may include at least one of the information regarding a downlink channel coefficient with respect to the effective antenna, the reception noise strength, the downlink channel size or signal strength with respect to the effective antenna, and the index of an antenna preferred by the UE or an antenna having channel quality exceeding a particular threshold value.

The second feedback information may include at least one of a CQI (channel quality indicator) and PMI (precoding matrix index) with respect to the allocated antenna.

The first feedback information may be transmitted with a first feedback information transmission period, the second feedback information may be transmitted with a second feedback information transmission period, and the first feedback information transmission period may be longer than the second feedback information transmission period.

The first feedback information may be transmitted with a first feedback information transmission period, the second feedback information may be transmitted with a second feedback information transmission period, and the first feedback information transmission period and the second feedback information transmission period may be equal.

The first feedback information and the second feedback information may be transmitted in the same subframe.

The second feedback information may be transmitted after a fixed number of subframes from a subframe in which the first feedback information is transmitted.

The antenna allocation information may include allocation information regarding at least one of a physical antenna, an antenna node, an antenna group, an antenna port, and a virtual antenna allocated to the UE.

According to another aspect of the present invention, there is provided a UE including an RF unit configured to transmit and receive a radio signal; and a processor connected to the RF unit, wherein the processor transmits first feedback information used for a base station to allocate at least one of a plurality of antennas to the UE to the base station, receives antenna allocation information determined based on the first feedback information from the base station, and transmits second feedback information indicating a channel state with respect to the antenna allocated according to the antenna allocation information to the base station.

ADVANTAGEOUS EFFECTS

According to embodiments of the present invention, a feedback method for operating a distributed antenna system is provided. A UE may be allocated an optimal antenna among a plurality of antennas distributedly disposed within a cell in a distributed antenna system to communicate with a base station (BS). Thus, transmission efficiency between a UE and a BS in a distributed antenna system can be improved. Also, in spite of feedback information added to allocate an antenna to a UE, feedback overhead is not greatly increased.

BEST MODES

The following technique may be used for various multiple access schemes such as CDMA (code division multiple access), FDMA (frequency division multiple access), TDMA (time division multiple access), OFDMA (orthogonal frequency division multiple access), SC-FDMA (single carrier-frequency division multiple access), and the like. CDMA may be implemented as a radio technology such as UTRA (Universal Terrestrial Radio Access) or CDMA2000. TDMA may be implemented as a radio technology such as GSM (Global System for Mobile communications)/GPRS (General Packet Radio Service)/EDGE (Enhanced Data Rates for GSM Evolution). OFDMA may be implemented as a radio technology such as IEEE 802.11 (Wi-Fi), IEEE 802.16 (WiMAX), IEEE 802-20, E-UTRA (Evolved UTRA), and the like. UTRA is a part of UMTS (Universal Mobile Telecommunications System). 3GPP (3rd Generation Partnership Project) LTE (long term evolution) is part of E-UMTS (Evolved UMTS) using E-UTRA, which employs OFDMA in downlink and SC-FDMA in uplink. LTE-A (Advanced) is an advancement of LTE.

Figure 1:
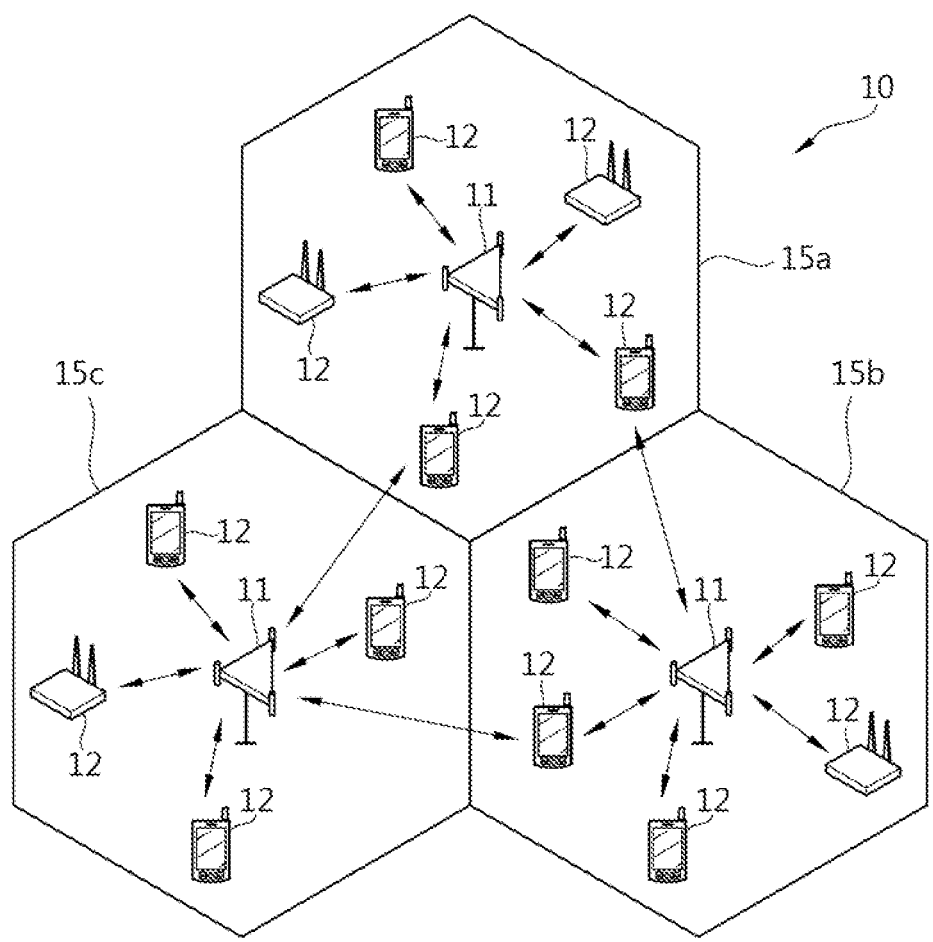
FIG. 1 is a block diagram illustrating a wireless communication system.

FIG. 1 illustrates a wireless communication system.

Referring to FIG. 1, the wireless communication system 10 includes at least one base station (BS) 11. Each BS 11 provides a communication service to particular geographical areas (which are generally called cells) 15a, 15b, and 15c. Each of the cells may be divided into a plurality of areas (or sectors). A user equipment (UE) 12 may be fixed or mobile and may be referred to by other names such as mobile station (MS), user terminal (UT), subscriber station (SS), wireless device, personal digital assistant (PDA), wireless modem, handheld device, etc. The BS 11 generally refers to a fixed station that communicates with the UE 12 and may be called by other names such as evolved-nodeB (eNB), base transceiver system (BTS), access point (AP), etc.

Hereinafter, downlink refers to a communication link from a BS to a UE, and uplink refers to a communication link from a UE to a BS. In downlink, a transmitter may be a part of a BS, and a receiver may be a part of a UE. In uplink, a transmitter may be a part of a UE, and a receiver may be a part of a BS.

A wireless communication system may support multiple antennas. Namely, a transmitter may use a plurality of transmit antennas, and a receiver may use a plurality of receive antennas. A transmit antenna refers to a physical or logical antenna used to transmit a single signal or stream, and a receive antenna refers to a physical or logical antenna used to transmit a single signal or stream. When a transmitter and a receiver uses a plurality of antennas, the wireless communication system may be called a MIMO (multiple input multiple output) system.

A MIMO system may use various transmission techniques. A transmission technique refers to a scheme of transmitting downlink data by a BS to a terminal. The MIMO transmission technique includes transmit diversity, spatial multiplexing, beamforming, and the like. The transmit diversity is a technique that multiple transmission antennas transmits the same data to thus enhance a transmission reliability. Spatial multiplexing is a technique that multiple transmission antennas simultaneously transmit different data to thus transmit high speed data without increasing a bandwidth of a system. Beamforming is used to increase a signal to interference plus noise ratio (SINR) of a signal by adding a weight value according to a channel state in multiple antennas. In this case, the weight value may be represented by a weight vector or a weight matrix, and it is known as a precoding vector or a precoding matrix.

Spatial multiplexing includes spatial multiplexing for a single user and spatial multiplexing for multiple users. The spatial multiplexing for a single user is called a single user MIMO (SU-MIMO), and the spatial multiplexing for multiple users is called spatial division multiple access (SDMA) or multi-user MIMO (MU-MIMO).

The MIMO transmission technique may be semi-statically set by a higher layer signal such as an RRC (radio resource control) message.

Figure 2:
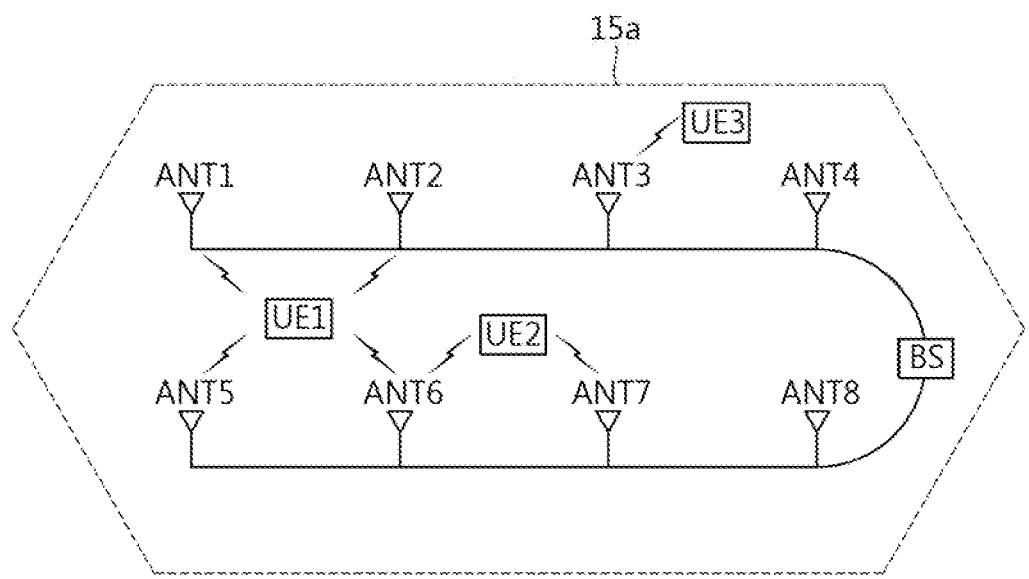
FIG. 2 is a view illustrating a distributed antenna system.

FIG. 2 is a view illustrating a distributed antenna system.

Referring to FIG. 2, a distributed antenna system (DAS) includes a BS and a plurality of BS antennas (e.g., ANT1 to ANT8, which are referred to as BS antennas, hereinafter). The antennas ANT1 to ANT8 may be connected to the BS through a fixed line or wirelessly. Unlike a centralized antenna system (CAS), in the DAS, the antennas are distributed to and disposed in various locations within a cell, rather than crowding in the center of the cell. In FIG. 2, an example in which a single antenna exists in each location isolated within a cell is illustrated, but the present invention is not limited thereto and several antennas may crowd in each location isolated within a cell. The crowded antennas may constitute a single antenna node.

Antennas may be distributed such that antenna coverages thereof overlap to allow for a rank-2 or higher order transmission. Namely, antenna coverage of each antenna may reach even at least one adjacent antenna. In this case, UEs existing within the cell may have strength of signals variably changing when the signals are received from a plurality of antennas according to locations thereof within the cell, a channel state, and the like.

Referring to the example of FIG. 2, a UE1 may receive signals having good reception sensitivity from antennas 1, 2, 5, and 6. Meanwhile, signals transmitted from antennas 3, 4, 7, and 8 may insignificantly affect the UE1 due to a path loss. A UE2 may receive signals having good reception sensitivity from antennas 6 and 7, and is insignificantly affected by signals transmitted from the other remaining antennas. Similarly, in the case of a UE3, it may receive a signal having good reception sensitivity only from an antenna 3, and signals from the other remaining antennas may have strength weak enough to be negligible.

As discussed in the above example, in the DAS, it may be easy to perform MU-MIMO communication on the UEs separated from each other within a cell. Namely, in the above example, communication to the UE1 may be performed through the antennas 1, 2, 5, and 6, communication to the UE2 may be performed through the antenna 7, and communication to the UE3 may be performed through the antenna 3. Antennas 4 and 8 may transmit signals for the UE2 or UE3 or may not transmit any signal. Namely, the antennas 4 and 8 may be operated in an OFF state according to circumstances. The number of transmission ranks or the number of transmission layers (i.e., the number of transmission streams) with respect to the UE1, UE2, and UE3 may differ. For example, when the UEs have two reception antennas, rank-2 transmission may be performed on the UE1 and rank-1 transmission may be performed on the UE2 and UE3.

As described above, when SU-MIMO/MU-MIMO communication is performed in a DAS, various transmission layers may exist per UE, and different antennas (or antenna groups) may be allocated to respective UEs. In other words, in a DAS, particular antennas may be supported for each UE. Antennas supported for each UE may be changed over time.

A method for transmitting feedback information of a UE applicable in a DAS will now be described.

Figure 3:
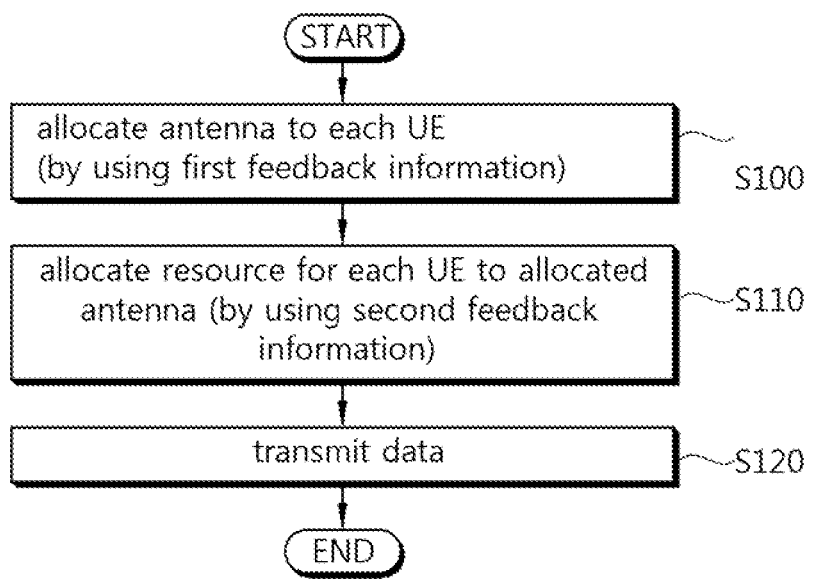
FIG. 3 is a flow chart illustrating a method for transmitting feedback information.

FIG. 3 is a flow chart illustrating a method for transmitting feedback information.

Referring to FIG. 3, a BS receives first feedback information from each UE and allocates antennas to each UE based on the first feedback information (S100). Namely, the first feedback information may be information used to allocate an antenna to a UE, which is transmitted by a UE to a BS. Through the first feedback information, the BS may know a channel coefficient with respect to a channel between the BS and the UE, a reception noise strength of the UE. Here, the antenna allocated by the BS to the UE does not necessarily mean a physical antenna. Namely, by using the first feedback information, the BS may allocate an antenna node, an antenna group, an antenna port, or a virtual antenna. An antenna node may be defined as a set of antennas transmitting the same reference signal for the BS to receive the first feedback information, and may be comprised of geographically adjacent antennas. An antenna group may be comprised of a plurality of antennas, and unlike an antenna node, an antenna group is not limited to antennas transmitting the same reference signal for the BS to receive the first feedback information. An antenna port is an antenna concept for estimating a single channel in a position of a UE. An antenna port may be configured as a single physical antenna, or may be configured as a combination of a plurality of physical antenna elements. A virtual antenna, the number of antennas different from a physical antenna transmitting a signal by a BS, refers to an antenna recognized by a UE. A virtual antenna may be implemented by a BS by using an appropriate precoding matrix.

When the BS knows a channel coefficient with respect to a channel between the BS and the UE and a reception nose strength of the UE, the BS may allocate an antenna in the form of at least one of a physical antenna, an antenna node, an antenna group, an antenna port, and a virtual antenna as described above according to a transmission technique.

The UE may transmit the first feedback information to the BS according to a persistent allocation scheme. The persistent allocation refers to transmission of the first feedback information by the UE continuously and periodically according to a one-time instruction from the BS.

Meanwhile, an antenna may be allocated by the BS according to a periodic allocation or an event-driven scheme. The event-driven scheme refers to a scheme of transmitting antenna allocation information only in case of changing by the BS an antenna already allocated to the UE.

The first feedback information transmitted by the UE may include at least one of the following items 1 to 5.

1. Information regarding downlink channel coefficient
2. Reception noise strength measured by UE
3. Size of downlink channel with respect to effective antenna or signal strength
4. Index of antenna preferred by UE or index of antenna having channel quality exceeding particular threshold value
5. Transmission of only uplink sounding reference signal (SRS) or information regarding transmission power of SRS together with SRS As described above, the BS may know a channel coefficient and reception noise strength with respect to each UE through the first feedback information. For example, it is assumed that the UE transmits 1. the information regarding downlink channel coefficient and 2. the reception noise strength measured by the UE, as the first feedback information. When a reception signal vector received by a reception antenna is y, it may be expressed by Equation shown below.

$$y = \begin{bmatrix} y_1 \\ y_2 \\ \vdots \\ y_i \\ \vdots \\ y_{N_R} \end{bmatrix} \quad \text{[Equation 1]}$$

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

In the above Equation, NR is the number of reception antennas of the UE, and a channel coefficient (element) hij of a channel matrix H refers to a channel from an antenna j within the cell to a reception antenna i of the UE. For example, h12 refers to a channel from an antenna 2 within the cell to a reception antenna 1 of the UE. And, n1, n2, . . . , nNR refers to noise of each reception antenna. In the Equation, when x is a reference signal already known by the UE, the UE may estimate a channel H and noise n through a reception signal. Here, the reference signal refers to a signal already known by the BS and the UE, which is used to estimate a channel or demodulate data. The reference signal may be called by other name such as midamble. The UE may feed back a channel coefficient of the channel H as '1. information regarding downlink channel coefficient', and may feed back reception noise strength regarding n as '2. Reception noise strength measured by UE'. Here, as the information regarding a downlink channel coefficient, an instantaneous channel coefficient may be fed back or an average channel coefficient during a particular period may be fed back. Also, as the information regarding a downlink channel coefficient, a channel coefficient of the channel H may be quantized in the form of an integer multiple of a particular value and transmitted, or the channel matrix H may be quantized and transmitted. Also, the information regarding a downlink channel coefficient may be transmitted only for a effective antenna. All the antennas within a cell or all the antennas to which a reference signal is provided may be effective antennas, or an antenna selected by the UE based on a particular reference may be a effective antenna. The particular reference may be, for example, an antenna that a strength of a reference signal received by the UE exceeds a particular threshold value.

Besides the method of directly transmitting information regarding the channel H as described above, a method for transmitting an index with respect to a matrix most similar to the channel H within a codebook may also be used.

In the first feedback information, 1 to 4 may be used when the UE measures a downlink channel and transmits channel information to a BS. When the BS measures an uplink channel, '5. uplink sounding reference signal (SRS) and/or information regarding transmission of transmission power of SRS' may be transmitted as the first feedback information.

In the related art, a BS measures an uplink channel by using an uplink SRS transmitted by a UE. In the related art method, however, since how greatly each UE amplifies an SRS and transmits it is not known, accuracy of measurement of an uplink channel is insufficient.

In comparison, in an embodiment of the present invention, when a UE transmits 1) an SRS and information regarding transmission power of the SRS as first feedback information, a channel can be more accurately estimated. The information regarding transmission power of an SRS may be given in various forms such as an amplification size, power, energy, and the like.

When a UE transmits 2) only the SRS as the first feedback information, the BS transmits previously designated amplification size, power energy, and the like.

In case of TDD (time division duplex), a downlink channel may be inferred from an uplink channel, so a BS can allocate a downlink transmission antenna to each terminal based on the results obtained by measuring an uplink channel.

Among the first feedback information, '1. Information regarding downlink channel coefficient, 3. Size of downlink channel with respect to effective antenna or signal strength, and 5. Uplink sounding reference signal (SRS) and/or information regarding transmission power of SRS' may be transmitted by normalizing them with '2. Reception noise strength measured by UE'. In this case, '2. Reception noise strength measured by UE' may not be additionally transmitted.

As described above, the BS may know a channel coefficient with respect to a channel with the UE and a reception noise strength of the UE by using the first feedback information. The BS allocates an antenna to each UE in consideration of a channel coefficient and reception noise strength of each UE. This method is advantages relative to the related art method. For example, in the related art, when each UE transmits an SRS, a BS measures the SRS and allocates an antenna to each UEE, or allocates an antenna to each UE based on an index of a preferred antenna transmitted by each UE, the number of antennas, and the like. In the related art method, however, when antennas preferred by respective UEs are repeated, an actually allocated antenna (or an antenna set) and an antenna (or antenna set) preferred by each UE may be different.

For example, when an antenna set preferred by the UE1 is {1, 2, 4} and an antenna sett preferred by the UE2 is {2, 3, 4}, the BS may allocate an antenna set {1,2} to the UE1 and an antenna sett {3,4} to the UE2. Here, feedback information (e.g., CQI) transmitted by each UE to the BS relates to a preferred antenna set, so the information is not identical to feedback information of an antenna set allocated by the BS to each UE. In addition, in the position of the BS, there is no basis for determining which of antennas is to be allocated to which terminal to obtain high transmission efficiency, so scheduling efficiency is degraded. In the foregoing example, there is no basis to determine whether the antenna 4 is better to be allocated to the UE1 or to the UE2.

In comparison, according to an embodiment of the present invention, since the BS knows a channel coefficient and reception noise strength, the BS can estimate a signal received by each terminal when a signal is transmitted through a particular antenna. Thus, the BS can determine which antenna set is most advantageous to be allocated to each UE, or know which CQI each UE may have when which antenna set is allocated. Thus, scheduling efficiency of the BS can be enhanced.

Referring back to FIG. 3, the BS performs resource allocation on each UE with respect to antennas allocated by using second feedback information (S110). Here, the second feedback information is information used to determine whether to transmit a signal by using which time/frequency resource to a UE with respect to an allocated antenna. The second feedback information may include, for example, CQI (channel quality indicator)/PMI (precoding matrix index)/RI (rank indicator), and the like. When the UE is allocated an antenna from the BS, the UE estimates a channel with respect to the allocated antenna (antenna set) and transmits channel state information as second feedback information. This step may be performed by using a conventional method performed in a concentrated antenna system (CAS).

The BS allocates resource to each UE by using the second feedback information, designates an MCS (modulation and coding scheme) level, or the like, and transmits data to each UE (S120).

Figure 4:
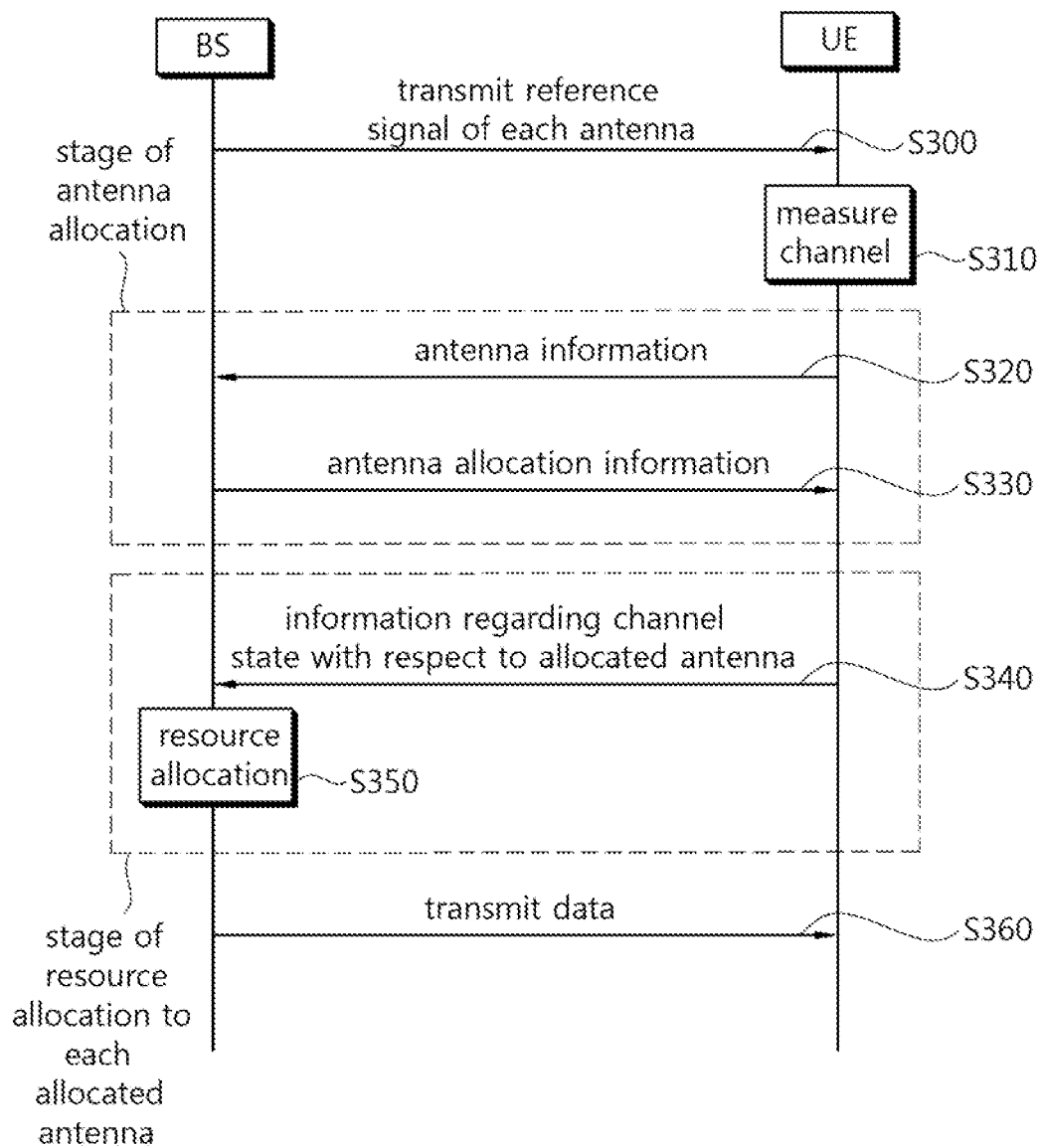
FIG. 4 is a flow chart illustrating a specific example of the method for transmitting feedback information of FIG. 3.

FIG. 4 is a flow chart illustrating a specific example of the method for transmitting feedback information of FIG. 3.

Referring to FIG. 4, the BS transmits a reference signal discriminated for each antenna with respect to a plurality of antennas within a cell (S300). The UE receives the reference signal and measures a downlink channel (S310). The UE feeds back antenna information to the BS (S320). Here, the antenna information may correspond to the foregoing first feedback information, which may include, for example, 1. Information regarding downlink channel coefficient, 2. Reception noise strength measured by UE, 3. Size of downlink channel with respect to effective antenna or signal strength, and 4. Index of antenna preferred by UE or index of antenna having channel quality exceeding particular threshold value. All the antennas within a cell or all the antennas to which a reference signal is provided may be effective antennas, or an antenna selected by the UE based on a particular reference may be a effective antenna. The particular reference may be, for example, an antenna that a strength of a reference signal received by the UE exceeds a particular threshold value.

The BS recognizes a channel with respect to a channel and reception noise strength by using antenna information, allocates an antenna to the UE, and transmits antenna allocation information to the UE (S330). The UE transmits channel state information with respect to the allocated antenna to the BS (S340). Here, the channel state information with respect to the allocated antenna corresponds to the foregoing second feedback information, and it may be CQI, PMI, or the like. The BS performs resource allocation on the UE based on the channel state information regarding the allocated antenna (S350). The BS transmits data to the UE according to the corresponding result (S360).

Figure 5:
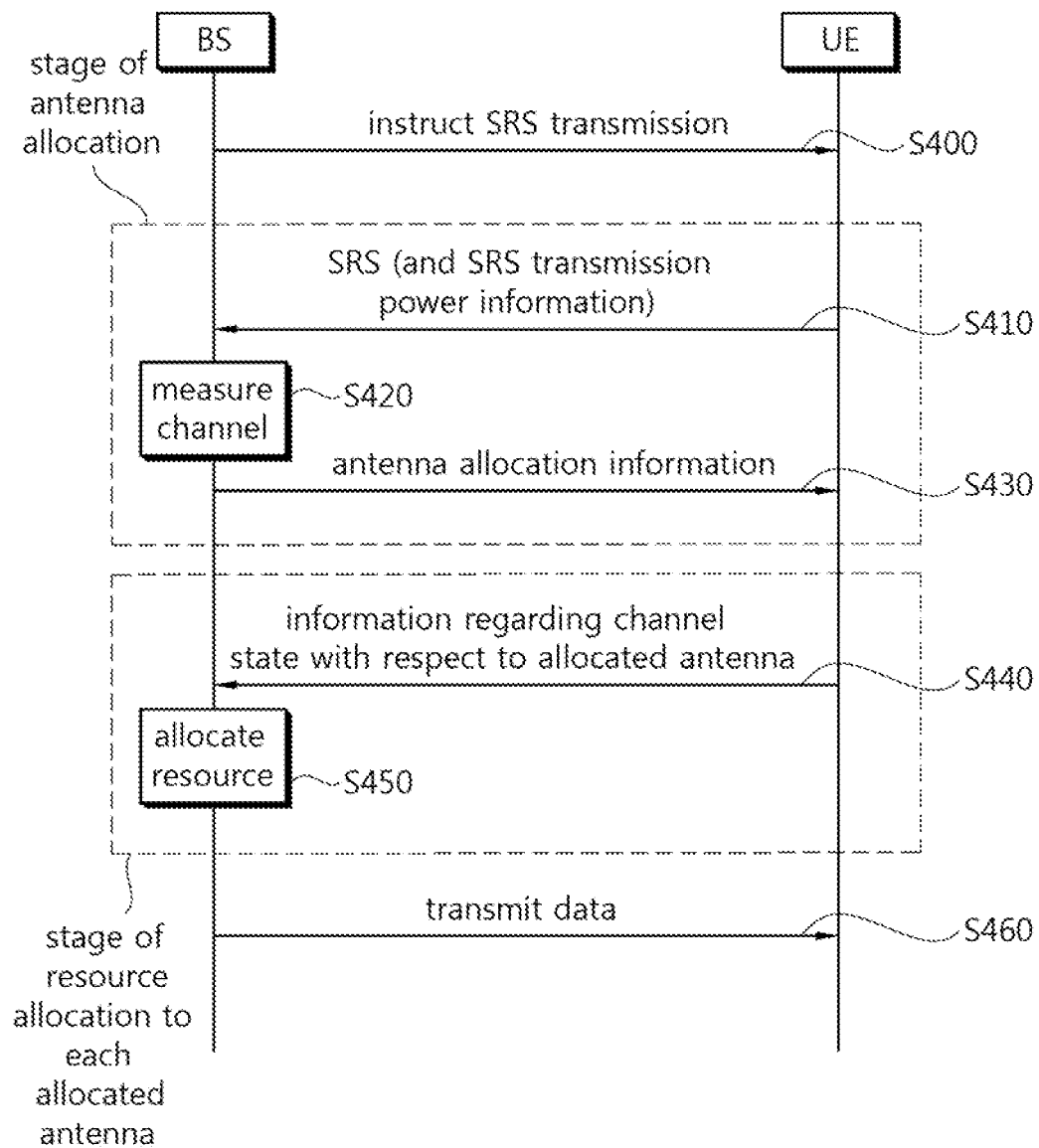
FIG. 5 is a flow chart illustrating another specific example of the method for transmitting feedback information of FIG. 3.

FIG. 5 is a flow chart illustrating another specific example of the method for transmitting feedback information of FIG. 3.

Referring to FIG. 5, the BS instructs (or requests) a UE to transmit an SRS (S400). Here, the BS may transmit control information for designating transmission power of the SRS to be transmitted by the UE, together.

In response to the SRS transmission instruction or request from the BS, the UE transmits an SRS (S410). The SRS corresponds to first feedback information. Here, when the UE receives the control information for designating transmission power of the SRS from the BS as mentioned above, the UE may apply transmission power to the SRS according to the control information. When the UE does not receive the control information for designating transmission power of the SRS from the BS, the UE may transmit the SRS and the information regarding transmission power of the SRS together.

The BS receives the SRS (and the information regarding transmission power of the SRS) and measures an uplink channel (S420). In case of TDD, a downlink channel may be inferred from an uplink channel. The BS may estimate a downlink channel coefficient and reception noise strength with respect to the UE from the uplink channel measurement results. The BS allocates an antenna to the UE by using the estimated downlink channel coefficient and reception noise strength, and transmits antenna allocation information to the UE (S430).

The UE transmits channel state information regarding the allocated antenna to the BS (S440), and the BS allocates resource to the UE (S450) and transmits data to the UE (S460). The channel state information corresponds to second feedback information.

Hereinafter, a method for transmitting first feedback information and second feedback information will be described.

Figure 6:
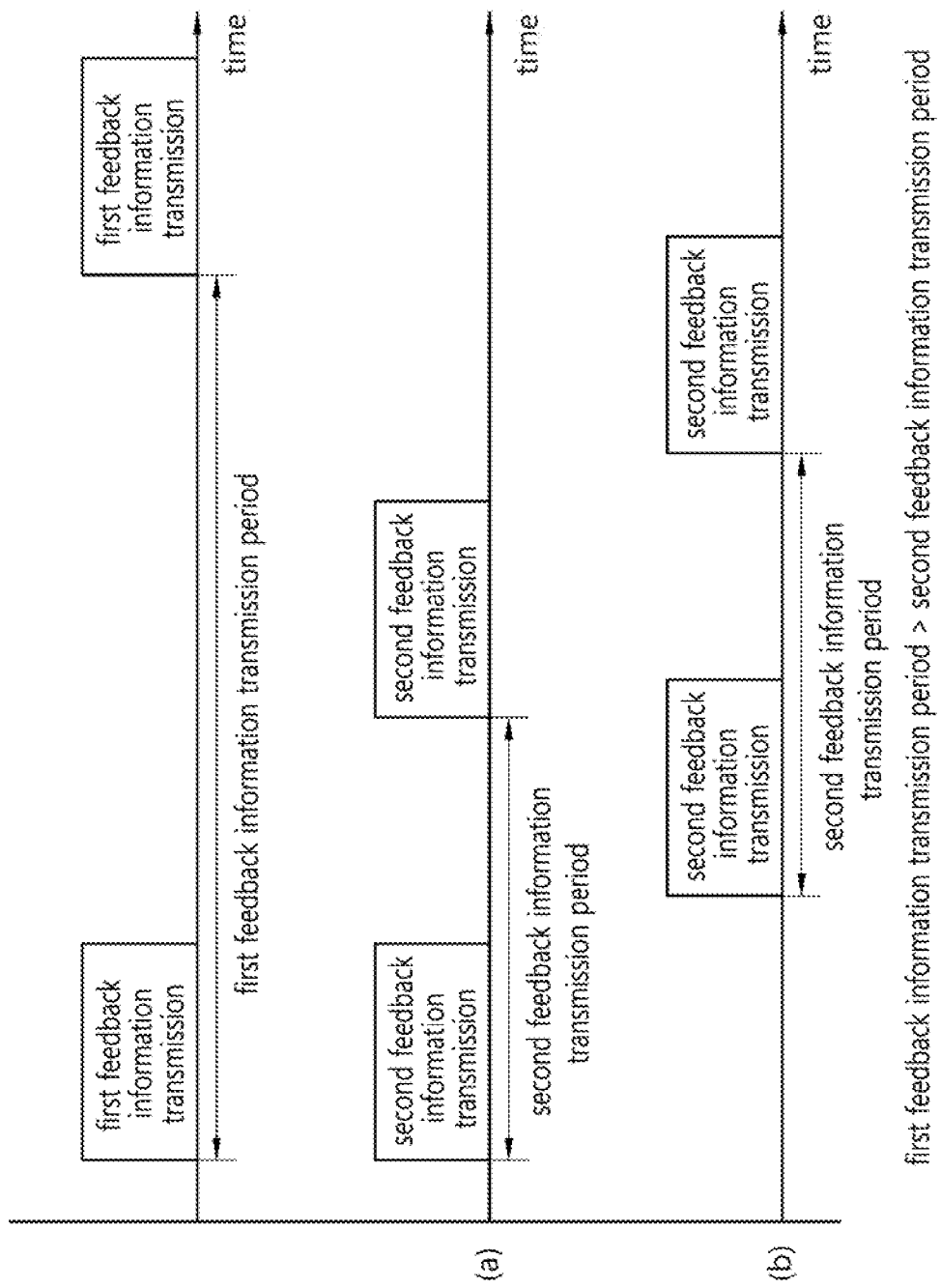
FIG. 6 is a view illustrating an example of a transmission period of first feedback information and that of second feedback information.

FIG. 6 is a view illustrating an example of a transmission period of first feedback information and that of second feedback information.

Referring to FIG. 6, a UE transmits first feedback information by a first feedback information transmission period, and second feedback information by a second feedback information transmission period. Here, the feedback information transmission period is greater than the second feedback information transmission period. Namely, the UE transmits the first feedback information used for antenna allocation at lower frequency than that of the second feedback information. This method is appropriately used when a channel between the UE and an antenna is slowly changed, because there is no quickly change the antenna allocated to the UE. The second feedback information used to allocated resource with respect to the allocated antenna may be transmitted during a relatively short period, e.g., at 5 subframe intervals. The second feedback information may be transmitted at the same time as that of the first feedback information as shown in FIG. 6(a), or may not as shown in FIG. 6(b).

As in the method described above with reference to FIG. 6, the scheme in which the first feedback information is transmitted at low frequency in comparison to the second feedback information is called semi-flexible scheduling. In the semi-flexible scheduling, the second feedback information is transmitted at least one time between transmissions of the first feedback information. The BS may estimate a change in channels between the UE and the allocated antenna through the second feedback information.

Figure 7:
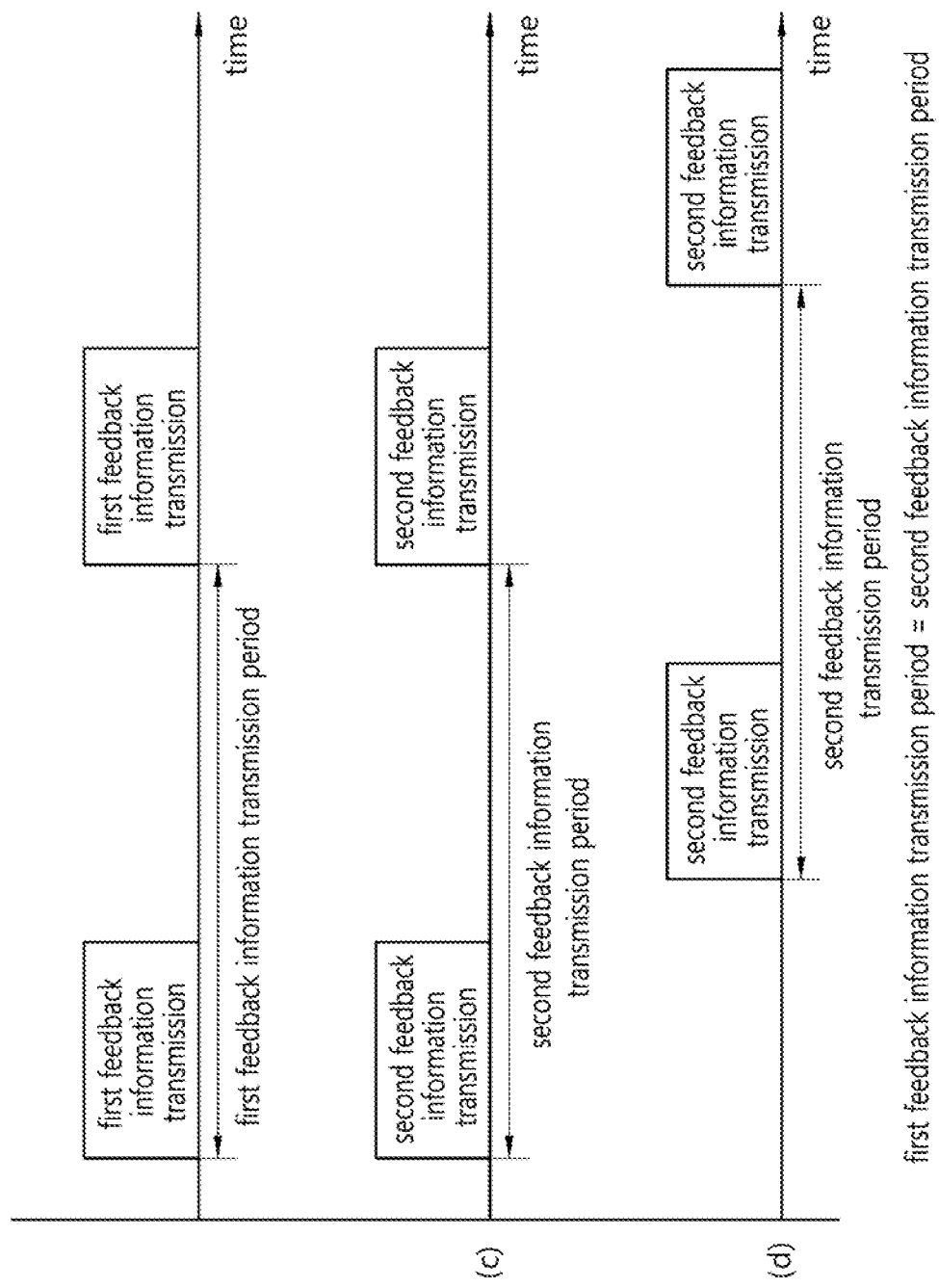
FIG. 7 is a view illustrating another example of a transmission period of first feedback information and that of second feedback information.

FIG. 7 is a view illustrating another example of a transmission period of first feedback information and that of second feedback information. In FIG. 7, a first feedback information transmission period and a second feedback information transmission period are equal.

Referring to FIG. 7, a UE transmits first feedback information by a first feedback information transmission period. Also, the terminal may transmit second feedback information by a second feedback information transmission period. The UE may transmit the first feedback information and the second feedback information during the same period of time, e.g., in the same subframe as shown in FIG. 7(a), or may transmit the first feedback information and the second feedback information during different periods of time, e.g., in different subframes as shown in FIG. 7(b). In the case of FIG. 7(b), after transmitting the first feedback information, the UE may transmit the second feedback information after a predetermined offset time (e.g., after a certain number of subframes). During the offset time, the BS may perform antenna allocation on the UE.

As in the method described above with reference to FIG. 7, the transmission of the first feedback information and the second feedback information simultaneously or at the same time intervals is called flexible scheduling. According to flexible scheduling, antenna allocation may frequently occur by a BS, relative to semi-flexible scheduling. Flexible scheduling is disadvantageous in that feedback and signaling overhead are great in comparison to semi-flexible scheduling, but advantageously increases performance of the DAS by providing flexibility in an antenna operation.

In FIGS. 6 and 7, the example of transmitting the first feedback information and the second feedback information with periods has been described, but the present invention is not limited thereto. Namely, the first feedback information and the second feedback information may be transmitted without a period.

In the above description, a portion or the entirety of the second feedback information may be omitted by the first feedback information. For example, a BS may perform resource allocation with respect to an allocated antenna, as well as performing antenna allocation with respect to a UE by using the first feedback information. In this case, the second feedback information may be omitted, rather than being transmitted. This method is advantageous in that delay due to signaling is reduced, although efficiency of resource allocation with respect to an antenna allocated to a UEE is slightly degraded.

Figure 8:
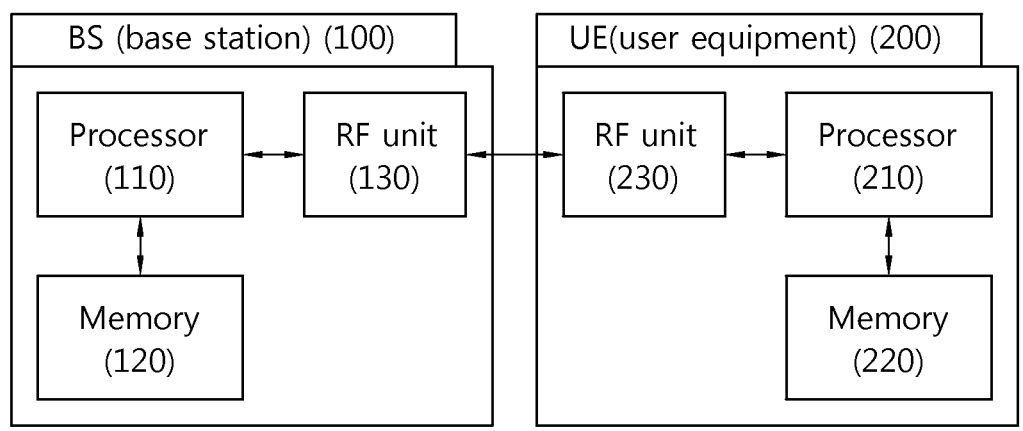
FIG. 8 is a block diagram of a base station and a UE.

FIG. 8 is a block diagram of a base station and a UE.

A BS 100 includes a processor 110, a memory 120, and an RF unit 130. The processor 110 implements a proposed function, process, and/or method. Namely, the processor 110 receives first feedback information from a UE, and generates and transmits antenna allocation information. Here, the BS estimates a channel coefficient with respect to a channel between an antenna and the UE and reception noise strength of the UE, and uses the same. Also, the BS 100 receives second feedback information from the UE and performs resource allocation with respect to an allocated antenna. The memory 120 is connected to the processor 110 and stores various types of information for driving the processor 110. The RF unit 130 is connected to the processor 110 and transmits and/or receives a radio signal.

A UE 200 includes a processor 210, a memory 220, and an RF unit 230. The processor 210 transmits first feedback information to a BS and receives antenna allocation information from the BS. The UE 200 measures a channel state with respect to an antenna allocated according to the antenna allocation information and transmits the results to the BS through second feedback information. The memory 220 is connected to the processor 210 and stores various types of information for driving the processor 210. The RF unit 230 is connected to the processor 210 and transmits and/or receives a radio signal.

The processors 110 and 210 may include an ASIC (Application-Specific Integrated Circuit), a chip-set, a logical circuit, a data processor, and/or a converter for converting a baseband signal and a radio signal from each other. The memories 120 and 220 may include a ROM (Read-Only Memory), a RAM (Random Access Memory), a flash memory, a memory card, a storage medium, and/or any other storage devices. The RF units 130 and 230 may include one or more antennas for transmitting and/or receiving a radio signal. When the embodiments are implemented by software, the foregoing techniques may be implemented by modules (processes, functions, or the like) performing the foregoing functions. The modules may be stored in the memories 120 and 220 and executed by the processors 110 and 210, respectively. The memories 120 and 220 may be provided within or outside the processors 110 and 210 and may be connected to the processors 110 and 210 through a well-known unit, respectively.

The method and apparatus as described above may be implemented by hardware, software, or a combination thereof. For hardware implementation, the method and apparatus as described above may be implemented by using application specific integrated circuits (ASICs), digital signal processors (DSPs), programmable logic devices (PLDs), field programmable gate arrays (FPGAs), processors, controllers, microprocessors, electronic units, or a combination thereof, designed to perform the foregoing functions. For software implementation, the method and apparatus as described above may be implemented by a module performing the foregoing functions. Software may be stored in a memory unit and executed by a processor. As the memory unit or the processor, various means well known to a person skilled in the art may be employed.

While the present invention has been shown and described in connection with the embodiments, it will be apparent to those skilled in the art that modifications and variations can be made without departing from the spirit and scope of the invention as defined by the appended claims.

The invention claimed is:

1. A method for transmitting feedback information of a user equipment (UE) in a distributed antenna system in which a plurality of antennas are distributed within a cell and are controlled by a base station (BS), the method comprising:

transmitting, to the BS, first feedback information for the plurality of antennas, the first feedback information being used by the BS to allocate at least one of the plurality of antennas to the UE;

receiving, from the BS, antenna allocation information determined based on the first feedback information; and transmitting, to the BS, second feedback information indicating a channel state with respect to the at least one of the plurality of antennas allocated to the UE according to the antenna allocation information, wherein, when the UE does not receive control information to configure a transmission power of a sounding reference signal (SRS) from the BS, the first feedback information includes the SRS and SRS power information indicating the transmission power of the SRS, wherein, when the UE receives the control information from the BS, the first feedback information includes the SRS without the SRS power information, wherein, when the BS transmits the control information to the UE, the SRS power information is determined by the BS without feedback based on the control information transmitted to the UE, and wherein the at least one of the plurality of antennas is allocated selected based on the SRS and the SRS power information.

2. The method of claim 1, wherein the first feedback information further includes information related to:

an effective antenna of the plurality of antennas, the effective antenna being an antenna transmitting a reference signal that exceeds a threshold value as measured by the UE, a downlink channel coefficient with respect to the effective antenna, a reception noise strength measured by the UE, a downlink channel size or signal strength with respect to the effective antenna, and an index of an antenna of the plurality of antennas preferred by the UE, and wherein the information related to the downlink channel coefficient, the downlink channel size or the signal strength are transmitted as values normalized with the reception noise strength measured by the UE.

3. The method of claim 1, further comprising:

receiving a sounding reference signal transmission request from the BS, wherein the sounding reference signal transmission request includes the control information.

4. The method of claim 1, wherein the second feedback information includes at least one of a CQI (channel quality indicator) or a PMI (precoding matrix index) with respect to the allocated at least one of the plurality of antennas.

5. The method of claim 4, wherein the first feedback information is transmitted with a first feedback information transmission period, the second feedback information is transmitted with a second feedback information transmission period, and the first feedback information transmission period is longer than the second feedback information transmission period.

6. The method of claim 4, wherein the first feedback information is transmitted with a first feedback information transmission period, the second feedback information is transmitted with a second feedback information transmission period, and the first feedback information transmission period and the second feedback information transmission period are equal.

7. The method of claim 6, wherein the first feedback information and the second feedback information are transmitted in a same subframe.

8. The method of claim 6, wherein the second feedback information is transmitted after a fixed number of subframes from a subframe in which the first feedback information is transmitted.

9. The method of claim 1, wherein the antenna allocation information includes allocation information regarding at least one of an antenna node allocated to the UE, an antenna group allocated to the UE, an antenna port allocated to the UE, or a virtual antenna allocated to the UE.

10. A user equipment (UE) configured to transmit feedback information of the UE in a distributed antenna system in which a plurality of antennas are distributed within a cell and are controlled by a base station (BS), the UE comprising:
 a radio frequency (RF) unit; and
 a processor operatively connected to the RF unit and configured to:
  transmit, to the BS, first feedback information for the plurality of antennas, the first feedback information being used by the BS to allocate at least one of the plurality of antennas to the UE;
  receive, from the BS, antenna allocation information determined based on the first feedback information; and
  transmit, to the BS, second feedback information indicating a channel state with respect to the at least one of the plurality of antennas allocated to the UE according to the antenna allocation information,
 wherein, when the UE does not receive control information to configure a transmission power of a sounding reference signal (SRS) from the BS, the first feedback information includes the SRS and SRS power information indicating the transmission power of the SRS,
 wherein, when the UE receives the control information from the BS, the first feedback information includes the SRS without the SRS power information,
 wherein, when the BS transmits the control information to the UE, the SRS power information is determined by the BS without feedback based on the control information transmitted to the UE, and
 wherein the at least one of the plurality of antennas is allocated based on the SRS and the SRS power information.

11. The UE of claim 10, wherein the first feedback information further includes information related to:
 an effective antenna of the plurality of antennas, the effective antenna being an antenna transmitting a reference signal that exceeds a threshold value as measured by the UE,
 a downlink channel coefficient with respect to the effective antenna,
 a reception noise strength measured by the UE,
 a downlink channel size or signal strength with respect to the effective antenna, and
 an index of an antenna of the plurality of antennas preferred by the UE, and
 wherein the information related to the downlink channel coefficient, the downlink channel size or the signal strength are transmitted as values normalized with the reception noise strength measured by the UE.

12. The UE of claim 10, wherein the second feedback information includes at least one of a CQI (channel quality indicator) or a PMI (precoding matrix index) with respect to the allocated at least one of the plurality of antennas.

13. The UE of claim 12, wherein the first feedback information is transmitted with a first feedback information transmission period, the second feedback information is transmitted with a second feedback information transmission period, and the first feedback information transmission period is longer than the second feedback information transmission period.

14. The UE of claim 12, wherein the first feedback information is transmitted with a first feedback information transmission period, the second feedback information is transmitted with a second feedback information transmission period, and the first feedback information transmission period and the second feedback information transmission period are equal.

* * * * *